United States Patent [19]

Vezza

[11] Patent Number: 5,135,896
[45] Date of Patent: Aug. 4, 1992

[54] SPINEL BONDABLE CERAMIC COMPOSITION

[75] Inventor: Thomas F. Vezza, Centre, Pa.

[73] Assignee: North American Refractories Company, Cleveland, Ohio

[21] Appl. No.: 429,759

[22] Filed: Oct. 31, 1989

[51] Int. Cl.$^5$ ............................................. C04B 35/10
[52] U.S. Cl. .................... 501/120; 501/113; 501/127; 501/153; 501/121; 106/692
[58] Field of Search ............... 501/120, 113, 127, 153, 501/121, 125; 106/100, 101, 692

[56] References Cited

U.S. PATENT DOCUMENTS

| | | | |
|---|---|---|---|
| 3,184,531 | 5/1965 | McCreight et al. | 501/120 |
| 3,567,472 | 3/1968 | Bratton | 501/120 |
| 4,002,483 | 1/1977 | Daugherty et al. | 106/100 |
| 4,039,343 | 8/1977 | Stein et al. | 501/114 |
| 4,729,974 | 3/1988 | Nazirizadeh et al. | 501/120 |
| 4,735,925 | 4/1988 | Kato et al. | 501/120 |

FOREIGN PATENT DOCUMENTS

| | | | |
|---|---|---|---|
| 3437386 | 4/1985 | Fed. Rep. of Germany | 501/127 |
| 0806649 | 3/1981 | U.S.S.R. | 501/113 |
| 1141083 | 2/1985 | U.S.S.R. | 501/113 |
| 0825908 | 12/1959 | United Kingdom | 501/120 |
| 0885804 | 12/1961 | United Kingdom | 501/120 |

OTHER PUBLICATIONS

*Introduction to Ceramics* Kingery et al., 2nd Edition (1976) p. 542, John Wiley & Sons.
"Alumina as a Ceramic Material" Gitzen (Feb. 1971) American Ceramic Society Publication, pp. 130-134.
Chemical Abstract-DD111672 (Mar. 5, 1975), Germany, "High Alumina Cement Containing Magnesium Aluminate Spinel" Jung (assignee).
Chemical Abstract-BE898008 Anseau et al. (Feb. 15, 1984), "Polyphase Ceramic Compositions..., for Prod. Containing Zirconia and Mullite".

Primary Examiner—William R. Dixon, Jr.
Assistant Examiner—Paul Marcantoni
Attorney, Agent, or Firm—Jones, Day, Reavis & Pogue

[57] ABSTRACT

A high alumina ceramic composition has controlled small amounts of MgO and CaO. When refractories made from the composition are fired, the alumina and MgO react to form spinel. The CaO promotes such reaction while minimizing undesirable expansion, and results in a refractory having significantly improved hot strength and other desirable physical properties.

22 Claims, 4 Drawing Sheets

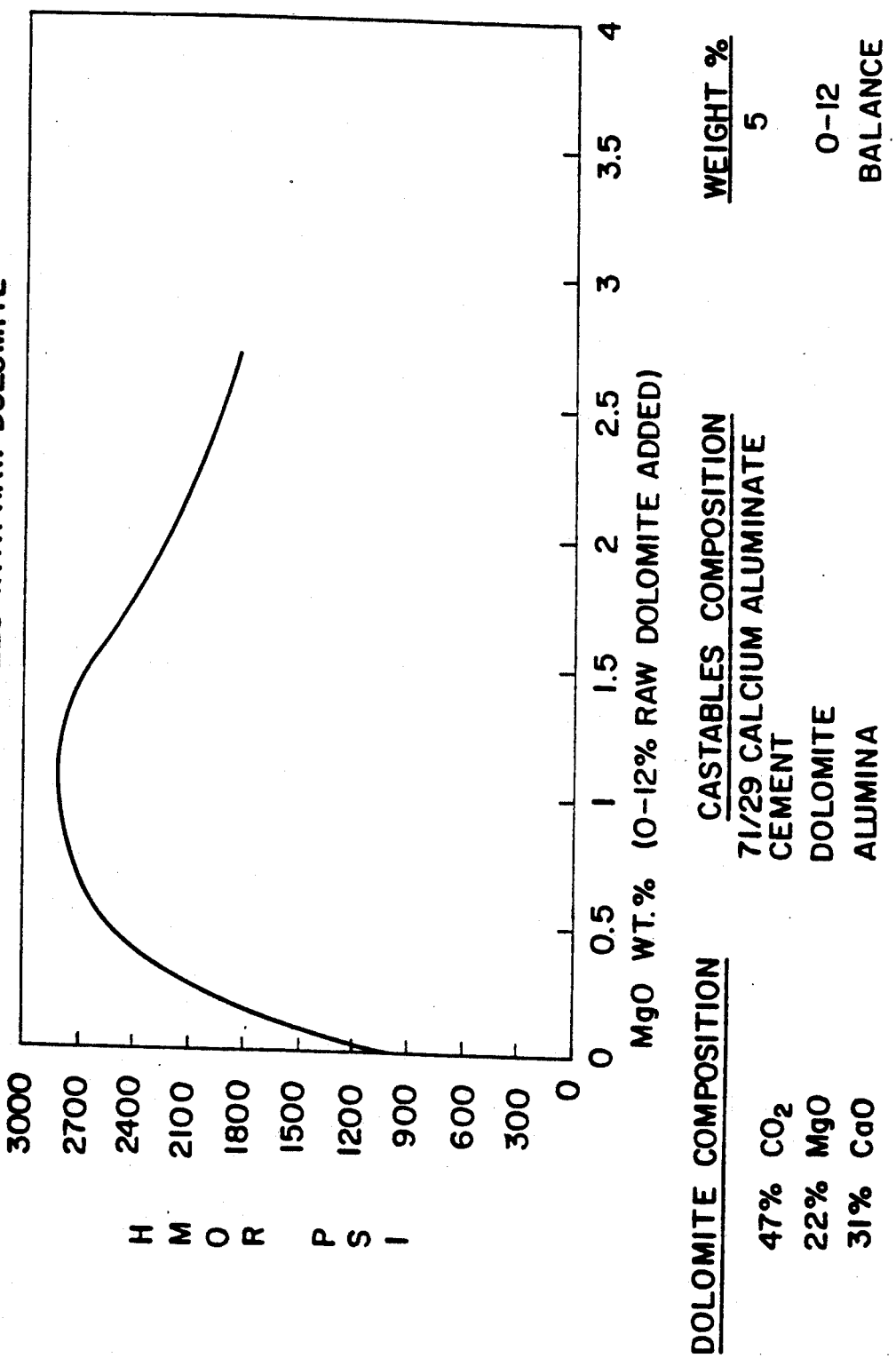

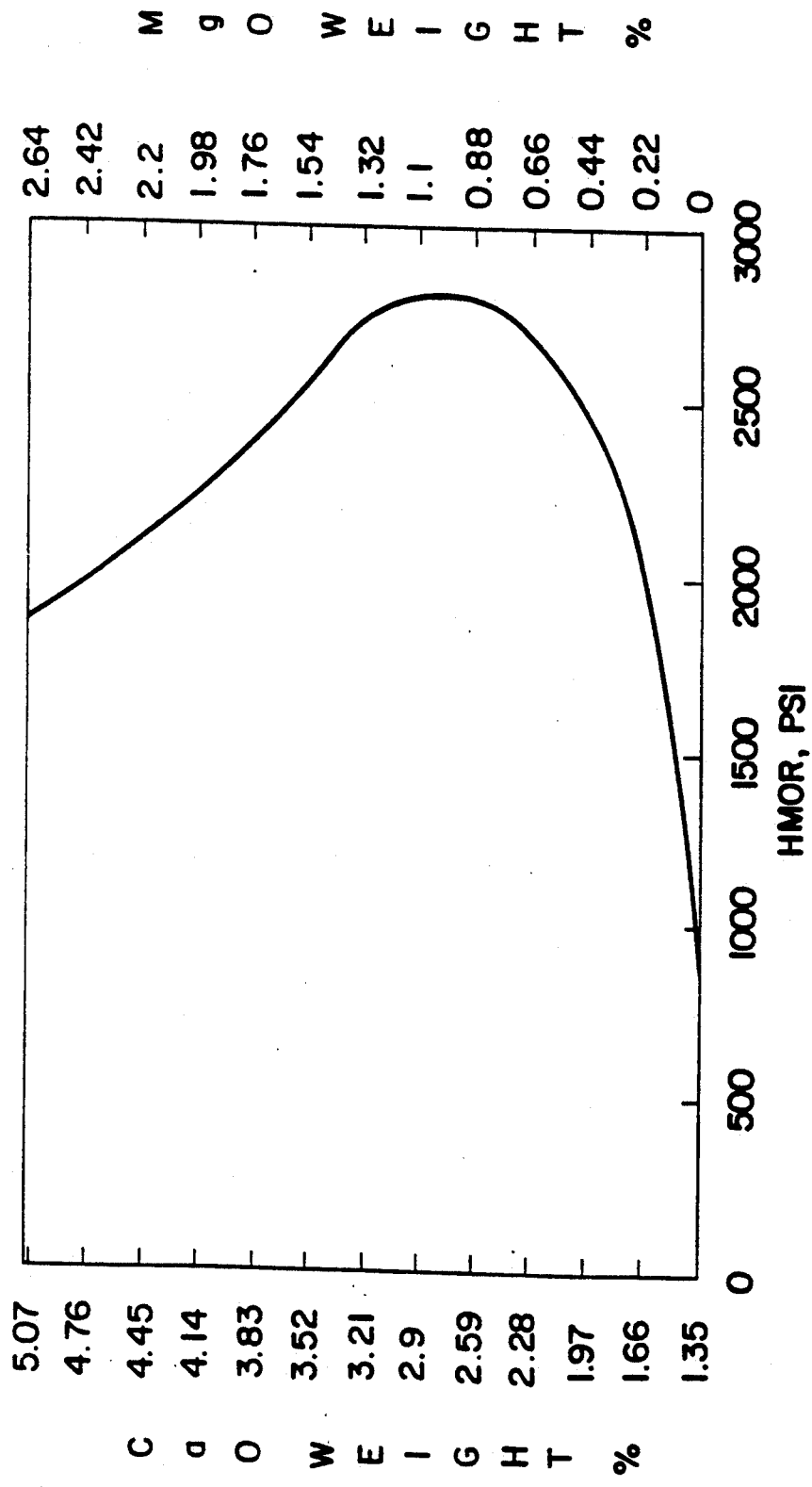
Fig. 4 HOT MODULUS OF RUPTURE AT 2700° F SPINEL BONDED ALUMINA CASTABLES WITH 5% BY WEIGHT OF CALCIUM ALUMINATE CEMENT AND RAW DOLOMITE

SPINEL BONDABLE CERAMIC COMPOSITION

BACKGROUND OF THE INVENTION

This application relates to the art of ceramic compositions and, more particularly, to such compositions that are spinel bondable when fired to high temperatures. The invention is particularly applicable to castable and pressable refractory compositions, and will be described with specific reference thereto. However, it will be appreciated that the invention has broader aspects, and that it can be used in ceramics other than refractories, and in environments other than those in which refractories are commonly used.

It is known that certain properties of refractory castables can be enhanced by utilizing preformed magnesium aluminate spinel in the composition used to make the refractory. However, use of preformed spinel in refractories is generally limited because it is very expensive.

Attempts have been made to form spinel bonded refractories by mixing alumina materials with magnesium oxide powder to form spinel in situ during firing to very high temperatures. However, spinel formation during firing results in a high degree of permanent expansion in the refractory, and further permanent expansion occurs when the refractory is subsequently reheated. This expansion is generally greater than 2%, and it can cause a disruption of the refractory structure upon firing. Also, greater expansion causes higher porosity and lower density, and a lowering of performance in severe refractory applications where there is contact with molten metals, slags and glasses.

SUMMARY OF THE INVENTION

Ordinarily, the presence of CaO is considered to be an impurity in an alumina refractory because it tends to lower the melting point of alumina. Typically, castable refractories having a high CaO content also have a relatively low high temperature strength.

In accordance with the present application, it has surprisingly been found that the presence of controlled amounts of CaO and MgO actually enhances spinel bonding that occurs from the reaction of MgO and alumina, and minimizes permanent expansion during initial firing an during reheating. Significant and unexpected improved hot strength has resulted, along with improved resistance to corrosion and penetration by slags and molten materials, all without any deterioration in other desirable physical properties, such as density and porosity.

In accordance with a preferred arrangement, the ceramic composition of the present application contains alumina as the principal ingredient, and about 0.10–5.0% MgO by weight of the entire composition, and about 0.10–6.0% CaO by weight of the entire composition.

Most preferably, when using raw dolomite as the source of MgO and at least part of the source of CaO, the most preferred amounts of MgO and CaO, in percent weight of the entire composition, are about 0.4–1.7% MgO and about 1.4–3.6% CaO. When raw dolomite is used, and the total MgO and CaO content is in these ranges, the ratio of total CaO content of the composition to total MgO content of the composition is preferably between about 2–5, and most preferably between about 2.2–3.5.

The reasons for the improved properties of a fired refractory when using controlled amounts of MgO and CaO in the composition are not fully understood, and it is uncertain whether chemical reactions or mechanical forces, or both, are involved. It is believed that the CaO catalyzes the reaction of alumina and MgO to form spinel when the composition is fired to the MgO-alumina reaction temperature. It is also possible that CaO helps to provide more uniform dispersal of spinel bonding throughout the refractory.

The CaO is believed to act as a sintering agent which keeps the refractory dense. It is possible that liquid state sintering is involved, wherein the liquid phase from the CaO controls expansion that tends to take place from spinel formation. At the same time that expansion is tending to take place from spinel formation, contraction is tending to take place due to CaO sintering.

In accordance with the present application, both the MgO and CaO can be provided in the composition as a pure oxide, as a hydrate, or as a carbonate. It may also be possible to use other compounds of Mg and Ca to provide the source of MgO and CaO, such as nitrates. In a preferred arrangement, the MgO is provided to the composition in the form of dolomite. Raw dolomite is simply a naturally occurring CaO-MgO carbonate, and it is quite stable and will not hydrate like pure MgO in the presence of water and steam. The total CaO content of the composition includes that which is added in the form of pure oxide, hydrate or carbonate, plus that which is in the composition from any calcium aluminate cement that may be used.

Sample mixes have suggested the possibility that raw dolomite may be more effective and more reactive at high temperatures than sintered MgO. The presence of CaO in the dolomite with the MgO may also provide optimum spinel bonding compared to arrangements where the CaO and MgO are added separately.

Raw dolomite usually contains about 47% by weight $CO_2$, about 22% by weight MgO and about 31% by weight CaO. At around 800° C., all of the $CO_2$ is driven off, leaving very reactive sources of MgO and CaO. Obviously, limestone can also be used as the source of CaO.

The composition of the present application consists essentially of about 0.10–5.0% MgO by weight, about 0.10–6.0% CaO by weight, 0–5% fibers by weight, and the remainder refractory oxide other than $SiO_2$. The refractory oxide preferably includes a substantial amount of alumina. The refractory oxide can include one or more refractory oxides other than $SiO_2$ and alumina. For example, in addition to the amounts of MgO, CaO and fibers set forth above, the composition may have 0–50% by weight refractory oxide other than $SiO_2$ and alumina, such as one or more of zirconia and chromic oxide, and the balance alumina. A refractory oxide other than $SiO_2$ and alumina may enhance shock resistance of refractories made with the composition.

The use of small fibers in castable refractories to minimize hydration and cracking is well known in the art. The castable is heated to an initial drying out temperature of around 300°–400° F. before firing to around 2,700° F. for spinel bonding.

Obviously, a dispersant can also be used with the castable refractory to reduce the amount of water needed for casting. While a dispersant is desired when casting the composition as a refractory in order to obtain optimum properties, the use of same is well known in the castable refractory art and is not part of the present invention. However, the phrase "consisting essentially of" is intended to cover compositions that contain conventional additives, such as dispersants, even though such additives are not specifically listed as an ingredient following the phrase "consisting essentially of," and even though such conventional additives can impart desired properties to the finished refractory.

It is a principal object of the present invention to provide ceramic compositions that are spinel bondable upon firing to high temperatures, and that will not undesirably hydrate during curing, drying or after firing.

It is another object of the invention to provide such compositions that form end products having superior physical properties.

It is also an object of the invention to provide such compositions that can be used to form refractories having improved strength at high temperatures, along with excellent resistance to corrosion and penetration by slag and molten materials.

It is a further object of the invention to provide such compositions that have controlled expansion behavior during and after firing to produce refractories having a very high density and a very low porosity.

BRIEF DESCRIPTION OF THE DRAWING

FIG. 3 is a graph showing the effect of varying amounts of MgO from dolomite on the hot modulus of rupture of a refractory at 2,700° F. when using a low amount of calcium aluminate cement; and FIG. 4 is a graph showing the effect of varying amounts of MgO and CaO from dolomite on the hot modulus of rupture of a refractory at 2,700° F. when using a low amount of calcium aluminate cement.

DESCRIPTION OF PREFERRED EMBODIMENTS

Figure 1:
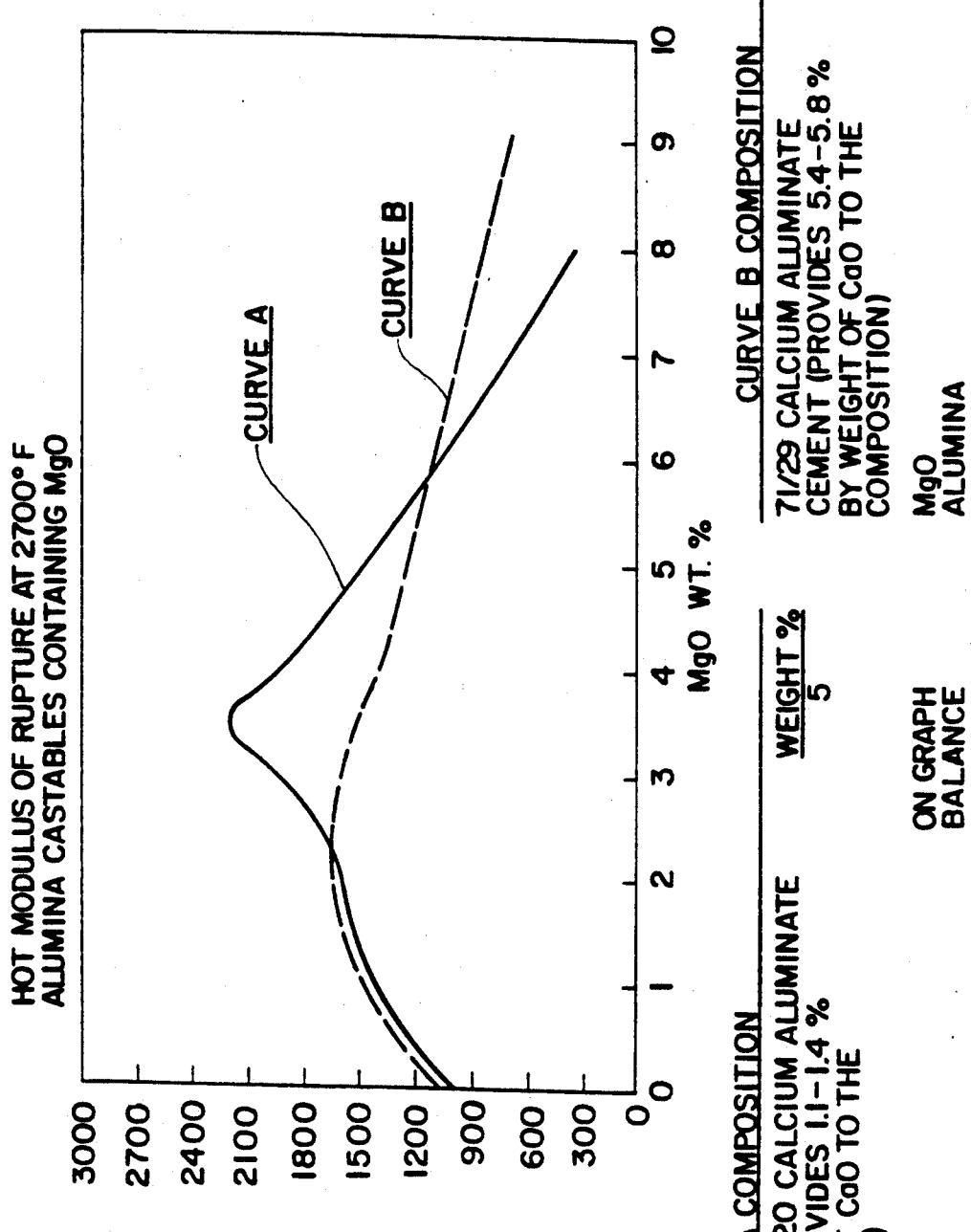
FIG. 1 is a graph showing the effect of varying amounts of MgO on the hot modulus of rupture of a refractory at 2,700° F. when using two different calcium aluminate cements containing different amounts of CaO.

Unless otherwise specifically indicated, when the term "% by weight" is used in this specification, it is meant the percent by weight of the particular ingredient based upon the weight of the entire composition.

A ceramic composition in accordance with the present application consists essentially of about 0.10–5.0% by weight MgO, about 0.10–6.0% by weight of CaO, about 0–0.5% by weight fibers, about 0–50% by weight refractory oxide other than alumina or silica, and the balance alumina. Conventional additives such as dispersants can be used, and it is intended to cover compositions containing such additives when using the phrase "consisting essentially of." This is so even though the additive is not specifically listed, and may be important to the processing, casting, shaping and curing of the composition, and may help impart desired properties to the final product. Thus, it is intended to cover conventional additives whose benefits to the composition and the final product, such as those identified above, are known to those skilled in the art.

Compositions in accordance with the present application may contain between 0–40% by weight calcium aluminate cement. Compositions having no calcium aluminate cement have been made using limestone as the source of CaO.

When calcium aluminate cement is used, it may contain varying amounts of alumina and CaO. Sample mixes have been made using 80/20 calcium aluminate cement having about 80% alumina by weight of the entire cement, and about 20% CaO by weight of the entire cement. Other sample mixes have been made using 71/29 calcium aluminate cement having about 71% alumina by weight of the entire cement, and about 29% CaO by weight of the entire cement. Obviously, cements having other alumina to CaO ratios can be used.

When CaO content of the composition is identified in this application, it includes the CaO in any calcium aluminate cement that may be added to the composition, plus any CaO that may be added to the composition independently of the cement. It is possible to rely solely upon the CaO contained in a calcium aluminate cement that may be used, without making any independent addition of CaO in another form.

It is believed that it may be possible to impart other desired properties to the composition for certain applications, such as improved shock resistance, by the use of a refractory oxide in addition to alumina but other than $SiO_2$, such as zirconia or chromic oxide. The refractory oxide other than alumina or $SiO_2$ may be used in the range of 0–50% by weight. Such material could be used in a combined form, such as fused alumina zirconia.

Although formation of spinel in situ in the presence of CaO is the preferred arrangement, it may also be possible to impart improved properties to compositions using preformed spinel by the use of controlled amounts of CaO.

The use of 0–0.5% by weight of fibers may be provided along with a drying procedure to minimize hydration and cracking.

The alumina may include about 60–90% by weight tabular alumina and about 1–40% by weight fine alumina powder. Tabular alumina is a refined high purity $Al_2O_3$ having a very dense grain structure. It is possible to mix tabular alumina and dolomite, and feed the mixture through a calcining furnace to provide a polycrystalline spinel bonded alumina coating on the tabular alumina. Around 0.1–4.0% dolomite by weight of the entire tabular alumina/dolomite mixture could be used. The calcining furnace heats the mixture to a temperature at which spinel will form. The tabular alumina may be in the form of pellets or briquets when coated with dolomite and processed in a calcining furnace.

Although the MgO may be provided to the composition in the form of a pure oxide or a hydrate, significantly improved results have been obtained by the use of about 0.1–12.0% by weight raw dolomite.

Fired refractories can be formed in accordance with the present application to have a hot modulus of rupture at 2,700° F. of at least 2,400 psi. The hot modulus of rupture is also more than two times such modulus for a refractory made using the same composition but without any MgO.

The following Tables 1, 2 and 3 give examples of refractories that have been formed with and without the use of MgO. Table 2 also gives an example of a refractory formed using dolomite.

TABLE 1

HIGH CEMENT REFRACTORY ALUMINA CASTABLES WITH AND WITHOUT MgO

|  | Without MgO | With MgO |
|---|---|---|
| Formulation, wt % |  |  |
| Tabular Alumina 3/200 Mesh | 70.0 | 67.5 |
| Fine Alumina −200 Mesh | 9.0 | 9.0 |
| 80/20 Calcium Aluminate Cement | 21.0 | 21.0 |
| Sintered Magnesium Oxide | 0.0 | 2.5 |
| Chemical Composition, wt. % |  |  |
| Alumina ($Al_2O_3$) | 93.7 | 91.0 |
| Magnesia (MgO) | 0.0 | 2.5 |
| Lime (CaO) | 5.8 | 5.8 |
| Casting Properties |  |  |
| Wate Added, % | 6.0–7.5 | 6.0–7.5 |
| Flow Value, % | 80–100 | 80–100 |
| Set Time, Hrs. | 12–24 | 12–24 |
| After Drying @230° F. |  |  |
| Bulk Density, lbs/ft$^3$ | 179 | 176 |
| Apparent Porosity, % | 13 | 13 |
| Modulus of Rupture, psi | 2,700 | 2,500 |
| After Firing @2,910° F. |  |  |
| Bulk Density, lbs/ft$^3$ | 168 | 171 |
| Apparent Porosity, % | 27 | 24 |
| Modulus of Rupture, psi | 2,100 | 2,800 |
| Permanent Linear Change, % | +0.10 | +0.10 |
| Hot Modulus of Rupture, psi |  |  |
| @2,700° F. | 1,200 | 1,800 |

TABLE 2

LOW CEMENT REFRACTORY ALUMINA CASTABLES WITH AND WITHOUT MgO AND WITH DOLOMITE

|  | Without MgO | With MgO | With Dolomite |
|---|---|---|---|
| Formulation, wt. % |  |  |  |
| Tabular Alumina 3/200 Mesh | 70.0 | 70.0 | 66.0 |
| Fine Alumina −200 Mesh | 25.0 | 21.5 | 25.0 |
| 80/20 Calcium Aluminate Cement | 5.0 | 5.0 | 5.0 |
| Sintered Magnesium Oxide | 0.0 | 3.5 | 0.0 |
| Raw Dolomite −14 Mesh | 0.0 | 0.0 | 4.0 |
| Chemical Composition, wt % |  |  |  |
| Alumina ($Al_2O_3$) | 98.4 | 95.0 | 96.2 |
| Magnesia (MgO) | 0.0 | 3.4 | 0.9 |
| Lime (CaO) | 1.4 | 1.4 | 2.8 |
| Casting Properties |  |  |  |
| Water Added, % | 4.5–5.5 | 5.5–6.0 | 4.5–5.0 |
| Flow Value, % | 35–50 | 35–50 | 35–50 |
| Set Time, Hrs. | 6–18 | 6–18 | 6–18 |
| After Drying @230° F. |  |  |  |
| Bulk Density, lbs/ft$^3$ | 195 | 189 | 191 |
| Apparent Porosity, % | 15 | 17 | 16 |
| Modulus of Rupture, psi | 1,900 | 1,500 | 1,700 |
| After Firing @2,910° F. |  |  |  |
| Bulk Density, lbs/ft$^3$ | 187 | 180 | 184 |
| Apparent Porosity, % | 21 | 23 | 22 |
| Modulus of Rupture, psi | 3,700 | 4,200 | 3,900 |
| Permanent Linear Change, % | +0.20 | +0.40 | +0.70 |
| Hot Modulus of Rupture, psi |  |  |  |
| @2,700° F. | 1,000 | 2,400 | 2,900 |
| @2,500° F. |  |  | 3,300 |
| @2,000° F. |  |  | 4,000 |
| @1,500° F. |  |  | 2,700 |

TABLE 3

PRESSED ALUMINA REFRACTORY MATERIAL WITH AND WITHOUT MgO

|  | Without MgO | With MgO |
|---|---|---|
| Formulation, wt. % |  |  |
| Tabular Alumina 14/200 Mesh | 80.5 | 80.1 |
| Fine Alumina −200 Mesh | 17.5 | 15.9 |
| Sintered Magnesium Oxide −200 Mesh | 2.0 | 2.0 |
| Limestone −200 Mesh | 0.0 | 2.0 |
| Chemical Composition, wt. % |  |  |
| Alumina ($Al_2O_3$) | 98.0 | 97.0 |
| Magnesia (MgO) | 2.0 | 2.0 |
| Lime (CaO) | 0.0 | 1.0 |
| Pressing Information |  |  |
| Water Added for Pressing, % | 3.2 | 2.9 |
| Tons of Pressure | 100 | 100 |
| Bulk Density, lbs/ft$^3$ | 175 | 174 |
| After Firing @2,885° F. |  |  |
| Bulk Density, lbs/ft$^3$ | 166 | 164 |
| Apparent Porosity, % | 30 | 30 |
| Permeability, cgs | 0.54 | 0.29 |
| Hot Modulus of Rupture, psi |  |  |
| @2,700° F. | 400 | 1,100 |

FIG. 1 shows the effect of MgO on the hot strength of two different refractory compositions containing different types and amounts of calcium aluminate cements. The curves show that hot strength increases when the amount of cement (and thereby CaO content) is decreased. Curve A shows that maximum strength was reached at an MgO content of about 3.5% by weight when using 5% by weight of the 71/29 calcium aluminate cement.

Figure 2:
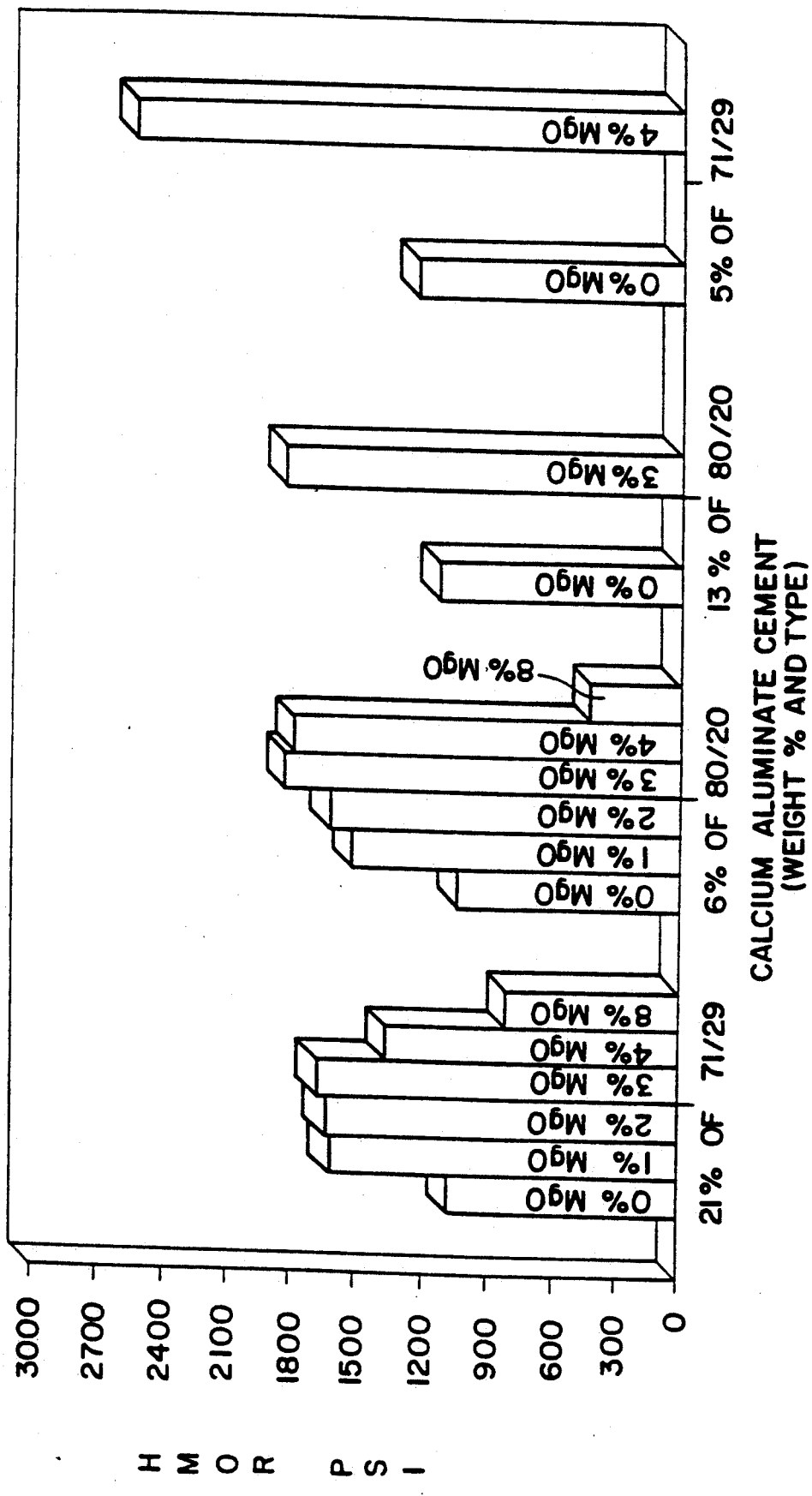
FIG. 2 is a bar graph showing the effect of varying amounts of MgO on the hot modulus of rupture of a refractory at 2,700° F. when using different amounts and types of calcium aluminate cements.

FIG. 2 illustrates preferred levels of added MgO which increase hot strength in alumina castable refractories containing different types and amounts of calcium aluminate cement. The graph shows a trend for increased hot strength regardless of type and content of cement. However, too much MgO results in decreased hot strength.

FIG. 3 shows the hot strength of alumina castable refractories using 5% by weight of 71/29 calcium aluminate cement and 0–12% by weight raw dolomite. The relationship between cement content and MgO content is not linear, and specific preferred levels of MgO and CaO result in optimum hot strength.

FIG. 4 shows the hot strength for alumina castable refractories using 5% by weight of 71/29 calcium aluminate cement and raw dolomite. The graph shows that maximum hot strength occurred when raw dolomite content was 2–6% by weight, giving a total CaO content ranging from 1.97–3.22% by weight and a total MgO content ranging from 0.44–1.32% by weight. This graph shows that when raw dolomite is used as the source of MgO and at least part of the CaO, the most preferred amounts of MgO and CaO, in percent weight of the entire composition, are about 0.4–1.7% MgO and about 1.4–3.6% CaO. When raw dolomite is used, and the total MgO and CaO content is in these ranges, the ratio of total CaO content of the composition to total MgO content of the composition is preferably between about 2–5, and most preferably between about 2.2–3.5.

A fired refractory made with the composition of the present application has a hot modulus of rupture at 2,700° F. of at least about 2,000 psi, and most preferably of at least about 2,400 psi. The spinel bonding renders the refractory more resistant to corrosion, and to penetration by slags and molten materials.

The use of −200 mesh dolomite suggests that slightly less dolomite is required to obtain a hot strength comparable to refractories in which −14 mesh dolomite was used. However, the reheat properties of a refractory made using −200 mesh dolomite were not as good as a refractory made using −14 mesh dolomite. As previously mentioned, the preferred arrangement uses raw dolomite as the source of at least part of the MgO and at least part of the CaO. Most preferably, the raw dolomite is the source of substantially all of the MgO and at least part of the CaO. The intimate relationship between the MgO and CaO in the dolomite is believed to enhance the beneficial effect of the CaO on the reaction between MgO and alumina, and on reducing expansion due to the reaction.

Refractories made with the compositions of the present application take on a characteristic pink color after firing. Obviously, other firing temperatures could be used, the importance of the temperature is simply that it be one at which spinel will form by the reaction of MgO and alumina.

Fired refractories made according to the present application were tested using a special slag cup test to evaluate slag and steel penetration. For each refractory sample, a 9 by 4.5 by 2.5 inch slab was molded with two cup-shaped depressions, each one inch deep and two inches in diameter. All slabs were prefired to 2,700° F. to cure same and form spinel. After cooling, 40 grams of #1 BOP slag were placed in one depression and 90 grams of steel shot were placed in the other depression. The slabs were then reheated to 2,800° F. for five hours. After cooling to room temperature, the slab is cut in half through the depressions and perpendicular to the face to expose the internal structure. Measurements of the slag and steel penetration are taken to determine resistance properties. Fired refractories made with the compositions of the present application exhibited far less penetration by the slag or steel compared to samples using standard compositions.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A castable ceramic composition consisting essentially of a source of about 0.10–6.0% by weight CaO in a fired product made from said composition, a source of MgO in an amount for providing a ratio of CaO to MgO between about 2–5 in a fired product made from said composition, 0–0.5% by weight fibers, 0–40% by weight calcium aluminate cement, and the balance including at least 40 wt % alumina, said source of MgO being selected from the group consisting of dolomite and a compound that provides no essential constituent of said composition other than a source of MgO, said source of CaO being selected from the group consisting of calcium aluminate cement, dolomite and a compound that provides no essential constituents of said mixture other than a source of CaO, said composition when fired forming spinel by reaction between MgO and alumina in the presence of CaO, said composition being substantially free of silica, said refractory oxide comprising at least 40% by weight of said composition, at least about 50% of said refractory oxide having a particle size larger than 200 mesh, said composition being castable into a shaped product which, after firing, has a hot modulus of rupture at 2,700° F. of at least about 2,000 psi.

2. The composition of claim 1 wherein a fired cast product made from said composition has a bulk density of at least about 171 pounds per cubic foot.

3. The composition of claim 1 wherein said calcium aluminate cement is about 5–40% by weight of said composition.

4. The composition of claim 1 wherein said source of substantially all of said MgO and at least part of said CaO consists essentially of raw dolomite in an amount between about 0.1–2.0% by weight of said composition.

5. The composition of claim 4 wherein the raw dolomite content is about 2–6% by weight of said composition.

6. A fired alumina refractory having a chemical composition that includes about 0.10–5.0% by weight of MgO, CaO in an amount for providing a ratio of CaO to MgO between about 2–5, at least 40% by weight of alumina, at least about 50% by weight of said alumina having a particle size larger than 200 mesh, said refractory having a hot modulus of rupture at 2,700° F. of at least about 2,000 psi and being substantially free of silica.

7. The refractory of claim 6 wherein said refractory has a bulk density of at least about 171 pounds per cubic foot and at least some of said CaO is from calcium aluminate cement.

8. The refractory of claim 7 wherein said refractory includes magnesium aluminate spinel and is made from a composition that is devoid of magnesium aluminate spinel prior to firing of the composition to form the refractory.

9. A ceramic composition containing about 0.1–12.0% by weight of raw dolomite, at least 40% by weight alumina, at least about 50% by weight of said alumina having a particle size larger than 200 mesh, at least about 5% by weight calcium aluminate cement, and being substantially free of silica.

10. A ceramic composition containing a source of about 0.10–5.0% by weight MgO and about 0.10–6.0% by weight CaO in a fired product made from the composition, at least 40% by weight alumina, at least about 50% by weight of said alumina having a particle size larger than 200 mesh, at least 5% by weight calcium aluminate cement, and being substantially free of silica.

11. A fired refractory having a chemical composition that includes at least 85% by weight alumina at least 50% of which has a particle size larger than 200 mesh, about 0.10–5.0% by weight of MgO, and about 0.10–6.0% by weight of CaO, said MgO and CaO being present in amounts and proportions to provide said refractory with a hot modulus of rupture at 2,700° F. of at least 2,000 psi.

12. The refractory of claim 11 wherein the ratio of CaO to MgO is between about 2–5.

13. The refractory of claim 11 wherein said MgO is about 0.4–1.7% by weight and said CaO is about 1.4–3.6% by weight.

14. The refractory of claim 11 having a chemical composition that is substantially free of silica and a bulk density of at least about 171 pounds per cubic foot.

15. A ceramic composition including at least 40% by weight alumina, at least 50% of said alumina having a particle size larger than 200 mesh, at least about 5.0% by weight calcium aluminate cement, and a source of about 0.10–5.0% by weight MgO and about 0.10–6.0% by weight CaO in a fired product made from said composition, said source of CaO including said calcium aluminate cement.

16. A ceramic composition comprising 0.1-12% by weight dolomite providing a source of MgO and CaO in a fired product made from the composition, at least 40% by weight alumina, at least 50% of said alumina having a particle size larger than 200 mesh, at least about 5% by weight calcium aluminate cement providing another source of CaO in a fired product made from the composition, said dolomite and calcium aluminate cement being present in quantities for providing a CaO to MgO ratio between about 2-5 in a fired product made from the composition, said composition being substantially free of silica.

17. A ceramic composition comprising a refractory oxide component at least 40% by weight, at least 50% of said refractory oxide component having a particle size larger than 200 mesh, at least 50% of a calcium aluminate cement component, a source of MgO for a fired product made from said composition, a source of CaO for a fired product made from said composition, said source of CaO including said calcium aluminate cement, said refractory oxide component being present in an amount to provide a fired product made from said composition with a chemical composition having at least about 85% by weight of refractory oxide that includes at least 40% by weight said calcium aluminate cement and said sources of MgO and CaO being present in amounts to provide a fired product made from said composition with about 0.1-5.0% by weight MgO and about 0.1-6.0% by weight CaO.

18. The composition of claim 17 wherein said calcium aluminate cement and said sources of MgO and CaO are included in amounts to provide a fired product made from said composition with a ratio of CaO to MgO between about 2-5.

19. The composition of claim 17 wherein said sources of MgO and CaO are included in amounts and proportions to provide a fired product made from said composition with a hot modulus of rupture at 2,700° F. of at least 2,400 psi.

20. A ceramic composition comprising a refractory component at least 40% wt of alumina that includes, at least 50% of said refractory component having a particle size larger than 200 mesh, and a source of MgO and CaO for a fired product made from said composition, said refractory component being present in an amount to provide a fired product made from said composition with at least about 90% by weight refractory oxide said refractory oxide comprising said source of MgO and CaO being present in amounts to provide a fired product made from said composition having a hot modulus of rupture at 2,700° F. of at least 2,000 psi.

21. A refractory having a chemical composition of at least about 90% by weight refractory oxide includes at least 40% by weight alumina includes the remaining chemical composition of said refractory including MgO and CaO said refractory oxide having a particle size and said MgO and CaO being present in amounts and proportions for providing said refractory with a hot modulus of rupture at 2,700° F. of at least 2,000 psi.

22. The refractory of claim 21 having a bulk density of at least about 171 pounds per cubic foot.

* * * * *